United States Patent
Bae et al.

(10) Patent No.: US 9,820,396 B2
(45) Date of Patent: Nov. 14, 2017

(54) HOUSING FOR ELECTRONIC DEVICE AND MANUFACTURING METHOD THEREOF

(71) Applicant: Samsung Electronics Co., Ltd., Gyeonggi-do (KR)

(72) Inventors: Kwang-Jin Bae, Gyeongsangbuk-do (KR); Hee-Cheul Moon, Gyeonggi-do (KR); Ik-Su Jung, Gyeonggi-do (KR); Jong-Chul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 14/040,534

(22) Filed: Sep. 27, 2013

(65) Prior Publication Data

US 2014/0092537 A1    Apr. 3, 2014

(30) Foreign Application Priority Data

Sep. 28, 2012    (KR) .................. 10-2012-0109104

(51) Int. Cl.
| | |
|---|---|
| B29C 45/14 | (2006.01) |
| H05K 5/02 | (2006.01) |
| B32B 5/26 | (2006.01) |
| H04M 1/02 | (2006.01) |
| H04M 1/18 | (2006.01) |

(52) U.S. Cl.
CPC ............... *H05K 5/02* (2013.01); *B32B 5/26* (2013.01); *B32B 2262/0269* (2013.01); *B32B 2262/101* (2013.01); *B32B 2571/00* (2013.01); *H04M 1/0249* (2013.01); *H04M 1/185* (2013.01)

(58) Field of Classification Search
CPC ................................. H05K 5/00; B29C 45/14
See application file for complete search history.

(56) References Cited

U.S. PATENT DOCUMENTS

| | | | |
|---|---|---|---|
| 2004/0081849 | A1 | 4/2004 | Westre et al. |
| 2006/0110599 | A1* | 5/2006 | Honma ............... B32B 5/10 428/413 |
| 2008/0020664 | A1 | 1/2008 | Hatjasalo et al. |
| 2011/0117872 | A1 | 5/2011 | Tseng |
| 2011/0155452 | A1 | 6/2011 | Liu et al. |
| 2012/0074007 | A1 | 3/2012 | Drummer |

FOREIGN PATENT DOCUMENTS

| | | |
|---|---|---|
| CN | 1387476 A | 12/2002 |
| CN | 102427925 A | 4/2012 |
| CN | 102615888 | 8/2012 |

(Continued)

OTHER PUBLICATIONS

Notice of Acceptance dated Jul. 31, 2015 in connection with Australian Patent Application No. 2013211544; 2 pages.

(Continued)

*Primary Examiner* — Andrew Piziali

(57) ABSTRACT

A housing forms the appearance of an electronic device. A method of manufacturing the housing includes selecting at least one fiber substrate for securing rigidity and at least one fiber substrate for securing ductility, determining quantity and stacking sequence of the selected fiber substrates, and laminating and attaching the fiber substrates according to the determined quantity and stacking sequence.

22 Claims, 15 Drawing Sheets

(56) References Cited

FOREIGN PATENT DOCUMENTS

| EP | 0736373 A1 | 10/1996 |
|---|---|---|
| JP | H 01-158050 | 6/1989 |
| JP | H 05-331776 | 12/1993 |
| JP | H 06-304859 | 11/1994 |
| JP | H 07-195409 | 8/1995 |
| JP | H 11-342555 | 12/1999 |
| JP | 3240088 B2 | 12/2001 |
| JP | 2004-209717 | 7/2004 |
| JP | 2010-263147 | 11/2010 |
| JP | 2012-096482 | 5/2012 |

OTHER PUBLICATIONS

First Office Action dated Aug. 19, 2015 in connection with Chinese Patent Application No. 201310452992.7; 18 pages.
Notice of Patent Grant dated Sep. 18, 2015 in connection with Japanese Patent No. 2013-163035; 5 pages.
International Search Report dated Nov. 21, 2013 in connection with International Patent Application No. PCT/KR2013/007076, 4 pages.
Written Opinion of International Searching Authority dated Nov. 21, 2013 in connection with International Patent Application No. PCT/KR2013/007076, 7 pages.
Extended European Search Report dated Nov. 27, 2013 in connection with European Patent Application No. 13180782.8, 6 pages.
Australian Patent Examination Report dated Jul. 23, 2014 in connection with Australian Patent Application No. 2013211544, 4 pages.
Japanese Notice of Preliminary Rejection dated Aug. 12, 2014 in connection with Japanese Patent Application No. 2013-163035, 11 pages.
Second Office Action dated Apr. 26, 2016 in connection with Chinese Patent Application No. 201310452992.7; 23 pages.
Xiaoquan Cheng, et al., "Methods for Improving Damage Tolerance of Composite Laminates after Low Velocity Impact and Their Influence Factors", Polymer Materials Science and Engineering, vol. 18, Issue 3, May 2002, 9 pages.
The State Intellectual Property Office of the P.R.C., "Decision of Rejection," Application No. 201310452992.7, 19 pages, dated Nov. 3, 2016, publisher SIPO, Beijing, China.
Notification of Reexamination dated Aug. 18, 2017 in connection with Chinese Patent Application No. 201310452992.7.

\* cited by examiner

# HOUSING FOR ELECTRONIC DEVICE AND MANUFACTURING METHOD THEREOF

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Sep. 28, 2012 and assigned Serial No. 10-2012-0109104, the entire disclosure of which is hereby incorporated by reference.

TECHNICAL FIELD

The disclosed embodiments relate to a housing for forming the appearance of an electronic device and a manufacturing method thereof.

BACKGROUND

Electronic devices such as mobile communication terminals (cellular phones), electronic schedulers, personal complex terminals, televisions (TVs), laptop computers, etc. have become necessities of current society based on development of electronic communication industries. The electronic devices have developed into important means of information transmission which are quickly changed. Each of these electronic devices has allowed a user to work conveniently through a Graphic User Interface (GUI) environment using a touch screen and has provided various multimedia based on a web environment.

Also, each of these electronic devices are designed to have a shape and appearance suitable for the taste of the user. Recently, a trend preferring the luxurious appearance of each of the electronic devices has risen. Manufacturers of the electronic devices are competing with one another to manufacture housings of the electronic devices, each of them forming the appearance of the electronic devices, some designed for luxury and beauty.

The housing can be a container which can have a shape which receives and surrounds components of the electronic device. This housing can have a degree of resistance against deformation provided from the outside, that is, rigidity. Rigidity helps prevent the deformation of the electronic device and protect components thereof. Also, the housing can have ductility as well as the rigidity. The electronic device can be broken or torn by an external force when the housing has only high rigidity. This ductility can make the housing capable of receiving deformation provided from the outside. For example, a housing with a separable battery cover, etc. can be bent when being attached or detached. Accordingly, ductility of the housing is needed.

In general, another housing is a plastic injection molding product. There is a limit to express exclusivity. It is difficult to secure all of rigidity and ductility of a certain level.

SUMMARY

To address the above-discussed deficiencies of the prior art, it is a primary object to provide a housing for an electronic device having rigidity and ductility and a manufacturing method thereof.

Another aspect of disclosed embodiments is to provide a housing for an electronic device for beautifying the appearance of the electronic device and a manufacturing method thereof.

Another aspect of disclosed embodiments is to provide a housing for an electronic device for laminating and attaching a plurality of fiber substrates and improving material properties of rigidity, ductility, etc. through mutual complement between the fiber substrates and a manufacturing method thereof.

Another aspect of disclosed embodiments is to provide a housing for an electronic device capable of being detachably attached and a manufacturing method thereof.

In accordance with an aspect of disclosed embodiments, a method of manufacturing composite materials is provided. The method includes selecting at least one fiber substrate for securing rigidity and at least one fiber substrate for securing ductility, determining quantity and stacking sequence of the selected fiber substrates, and laminating and attaching the fiber substrates according to the determined quantity and stacking sequence.

In accordance with another aspect of disclosed embodiments, a method of manufacturing composite materials is provided. The method includes selecting a plurality of prepregs, determining quantity and stacking sequence of the selected prepregs, determining cross angles of fiber arrays between the selected prepregs, and laminating and attaching the prepregs according, to the determined quantity, stacking sequence, and cross angles.

In accordance with another aspect of disclosed embodiments, an electronic device is provided. The electronic device includes a plurality of electronic components and at least one housing for protecting the electronic components and forming the appearance of the electronic device, wherein the housing includes composite materials in which at least two fiber substrates are laminated and attached.

Before undertaking, the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 5, discussed below, and the various embodiments used to describe the principles of the present disclosure in this patent document are by way of illustration only and should not be construed in any way to limit the scope of the disclosure. Exemplary embodiments will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein must be understood based on the descriptions made herein.

Figure 1A:
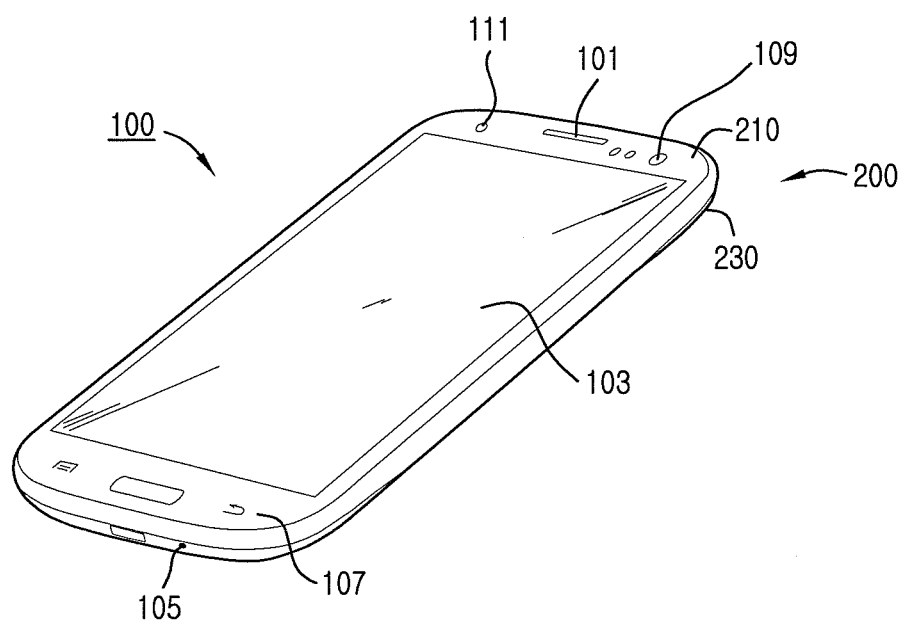
FIGS. 1A and 1B illustrate perspective views of an electronic device according to one or more embodiments.
Figure 1B:
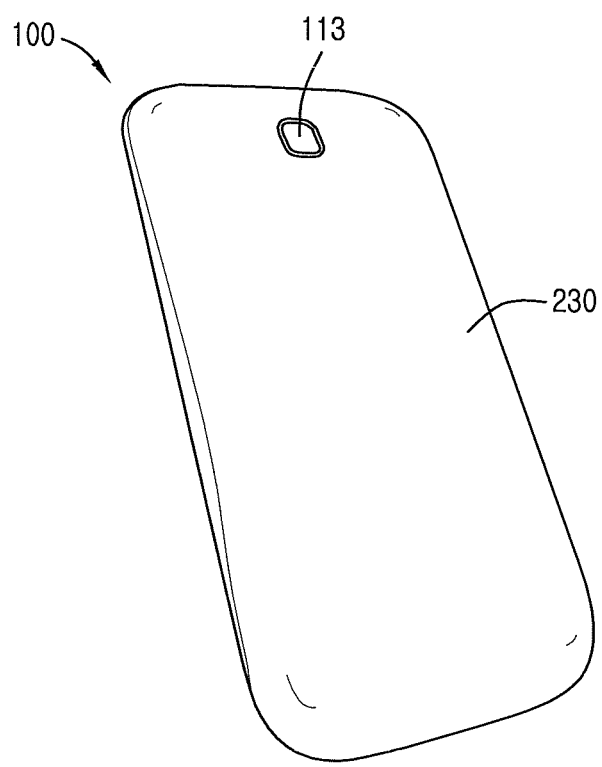

FIGS. 1A and 1B illustrate perspective views of an electronic device according to one or more embodiments.

Figure 1C:
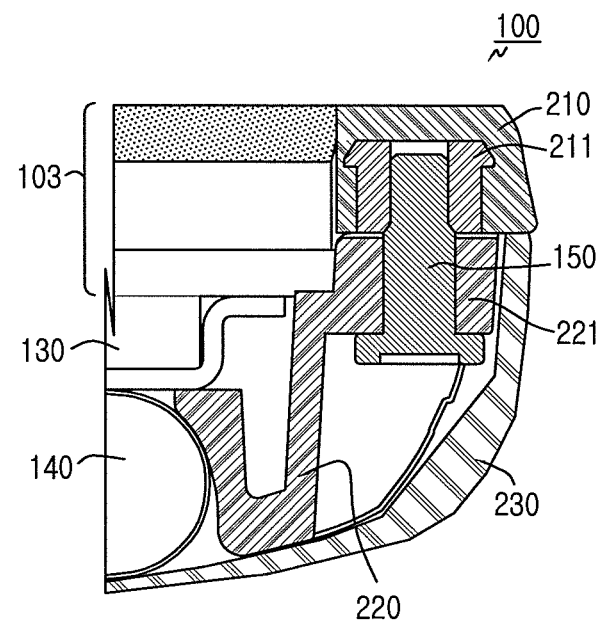
FIG. 1C is a cross-section view illustrating, a structure of an electronic device according to one or more embodiments.

FIG. 1C is a cross-section view illustrating a structure of an electronic device according to one or more embodiments.

Referring to FIGS. 1A to 1C, the electronic device denoted by 100 includes a speaker device 101 for outputting sounds, a touch screen device 103 which is positioned under the speaker device 101 to display images and receive touch input, a microphone device 105 which is positioned under the touch screen device 103 to receive sounds, a keypad device 107 having input buttons, a front camera device 109, and a rear camera device 113.

The electronic device 100 has a housing 200 which forms the appearance thereof. The above-described components are received in a receiving space of the housing 200. The housing 200 includes a front housing 210, a rear housing 220, and a rear cover 230.

The front housing 210 and the rear housing 220 are combined, and form a space for receiving internal components of the electronic device 100. The rear cover 230 covers the rear housing 220. The front housing 210 is disposed in a front surface of the electronic device 100. The rear cover 230 is disposed in a rear surface of the electronic device 100.

The front housing 210 and the rear housing 220 are combined, and form a container shape which is opened in a front direction of the electronic device 100. The touch screen device 103 is disposed on a main board 130, and includes a window and a display. The touch screen device 103 and the main board 130 are mounted on the receiving space formed by combination of the front housing 210 and the rear housing 220. A battery 140 is received in a space formed by combination of the rear housing 220 and the rear cover 230.

The window is transparent, and is exposed on a front surface of the electronic device 100. Images are displayed through the window. The main board 130 is a board on which a basic circuit and a plurality of electronic components are mounted. The main board 130 sets an execution environment of the electronic device 100 and holds the set information. The main board 130 drives all devices of the electronic device 100 stably, and inputs, outputs, and exchanges data of all the devices of the electronic device 100 smoothly.

The front housing 210 has a boss 211 which is formed to be screwed together with the rear housing 220. The boss 211 has a screwing part in which a screw hole coupled with a screw is formed. This screwing part is made of metal and is formed in the boss 211 in injection molding. The rear housing 220 has a boss coupling hole 221 which is formed to be screwed together with the boss 211 of the front housing 210. A screw 150 penetrates the boss coupling hole 221 of the rear housing 220 and is then coupled to the boss 211 of the front housing 210. Accordingly, the front housing 210 and the rear housing 220 are combined.

Figure 1D:
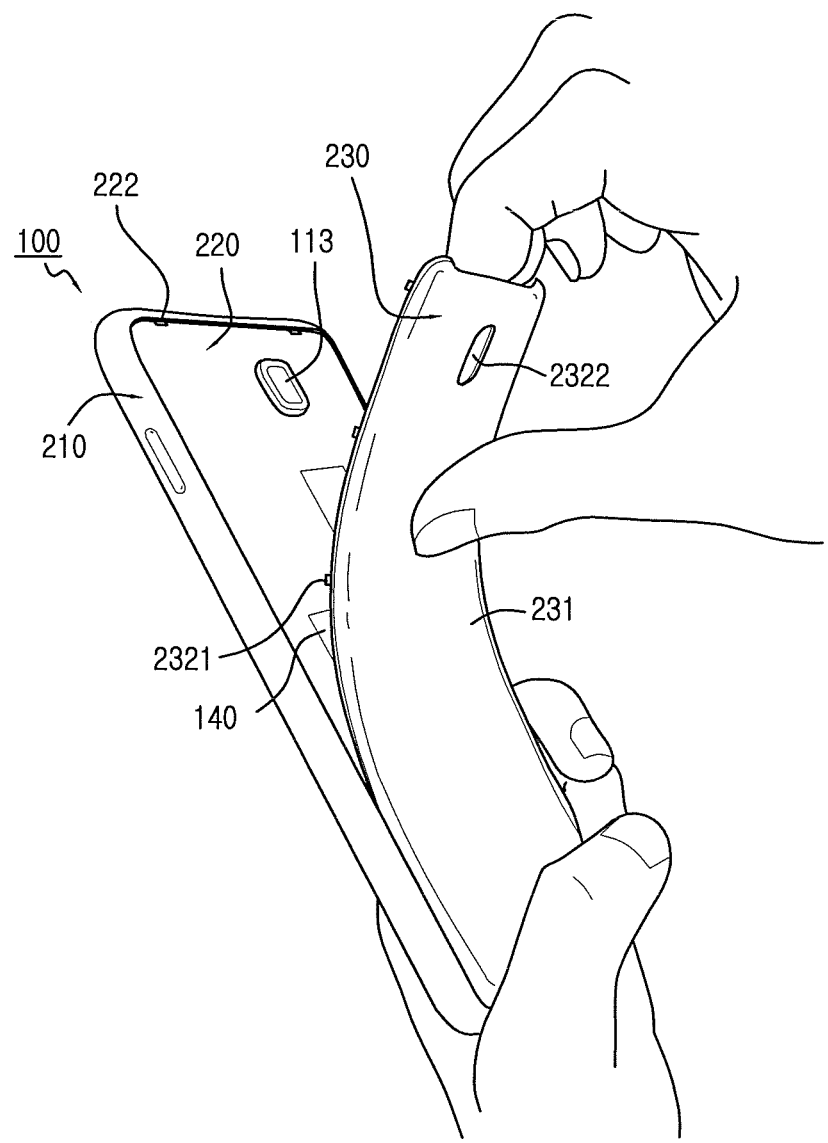
FIG. 1D illustrates detachment of a rear cover of an electronic device according to one or more embodiments.

FIG. 1D illustrates detachment of a rear cover of an electronic device according to one or more embodiments.

Referring to FIGS. 1C and 1D, the rear cover 230 can be coupled to the rear housing 220 or be decoupled from the rear housing 220. The rear cover 230 has snap-fits 2321 which can be disposed on its edges. The rear housing 220 has coupling grooves 222 which are formed in its certain positions of edges, corresponding to the snap-fits 2321. When the rear housing 220 and the rear cover 230 are coupled, the snap-fits 2321 are coupled to the coupling grooves 222. When the rear cover 230 is coupled to or decoupled from the rear housing 220, as shown in FIG. 1D, the rear cover 230 is elastically bent and deformed. Also, the rear cover 230 has a hole 2322 for exposing a camera device 113 which is received in the front housing 210 and the rear housing 220.

Figure 2:
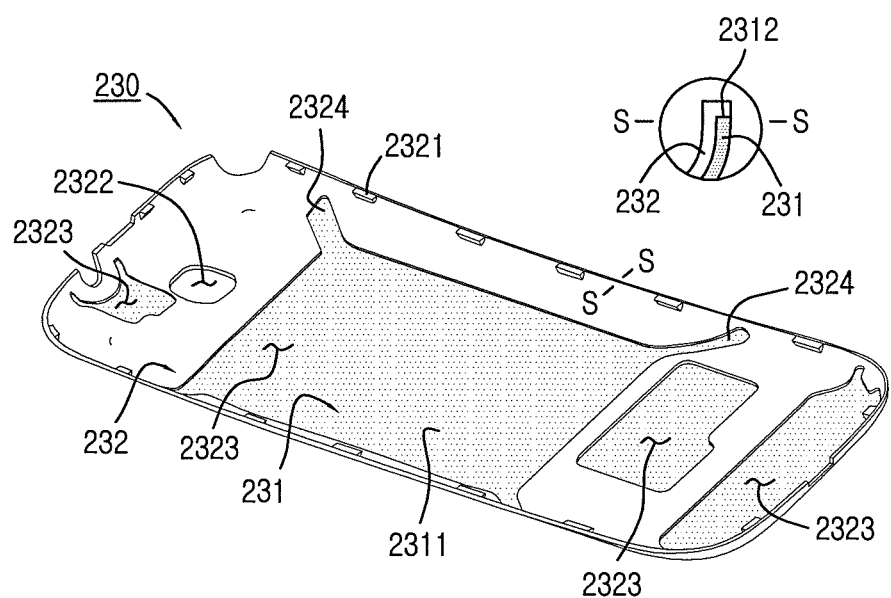
FIG. 2 illustrates a perspective view of a rear cover of an electronic device according to one or more embodiments.

FIG. 2 illustrates a perspective view of a rear cover of an electronic device according to one or more embodiments.

Referring to FIGS. 1D and 2, the rear cover 230 includes a composite material device 231 and a plastic injection molding, product 232 which is molded at an inner side of the composite material device 231 by insert molding. The plastic injection molding product 232 can be insert-molded to be extended to an end portion of the composite material device 231. This plastic injection molding product 232 can resist breaking and tearing which can occur when the rear cover 230 is composed of only the composite device 231.

The plastic injection molding product 232 has the snap-fits 2321 capable of being coupled with the coupling grooves 222 of the rear housing 220. Also, the plastic injection molding product 232 is insert-molded at the inner side 2311 of the composite device 231 such that a portion 2323 overlapped with electronic components such as an antenna and a speaker is omitted. A space capable of securing performance of these electronic components is formed in the plastic injection molding product 232.

In addition, in order to solve a problem such as bending or distortion generated by shrinkage factor difference with the composite material device 231, the plastic injection molding product 232 can be insert-molded at a portion around an edge of the composite device 231 or can be insert-molded to have slits 2324 at edges of the portion 2323 where injection molding products are omitted, particularly, corners. Therefore, deformation of the rear cover 230 by contraction of the plastic injection molding product 232 can be prevented and stability of size can be secured.

The composite material device 231 can secure the properties of rigidity and ductility. The composite material device 231 can be manufactured through molding processes such as Numerical Control (NC) machining, deformation, etc. from a composite material sheet which is manufactured by two methods which will be described later.

Composite materials are composed by combining two or more substrates and are artificial materials having excellent characteristics which cannot be obtained by a single material. The composite materials are molded using pre-impregnated materials (hereinafter referred to as prepreg). The prepreg is for example a product which can have a sheet shape, in which a reinforced fiber is impregnated with a matrix. A designer can make a product of composite materials having desired characteristics using the prepreg. The reinforced fiber of the prepreg can include, for example, any one of a carbon fiber, a glass fiber, and an aramid fiber. The matrix can include, for example, any one of an epoxy resin, a polyester resin, and a thermoplastic resin. The prepreg forms various product groups according to the kind of a fiber, the array type of the fiber, and the kind of matrix used.

Firstly, the composite material sheet according to one or more embodiments can be molded through attachment between fiber substrates using an attachment process such as a hot press and an autoclave after heterogeneous fiber substrates (e.g., prepregs), and particularly, a fiber substrate capable of securing rigidity and a fiber substrate capable of securing ductility are laminated. If necessary, quality, stacking sequence, quantity, etc. of the heterogeneous fiber substrates can be changed.

Figure 3A:
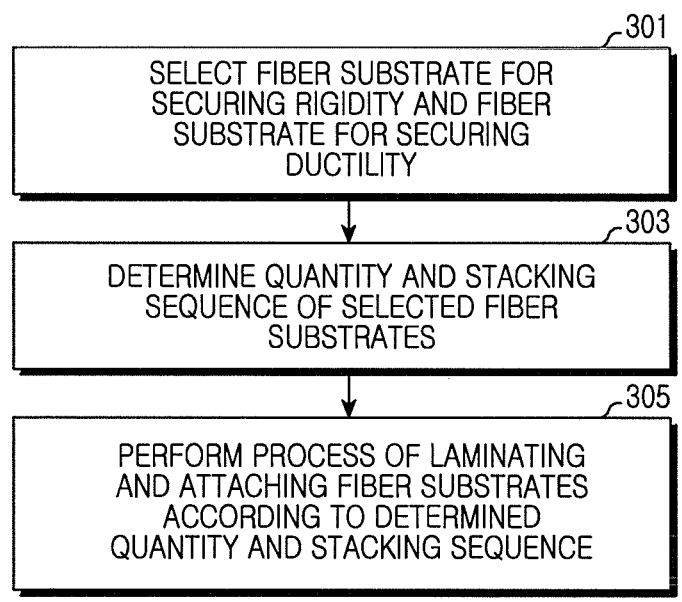
FIG. 3A illustrates a process of manufacturing a composite material sheet according to one or more embodiments.

FIG. 3A illustrates a process of manufacturing a composite material sheet according to one or more embodiments.

Referring to FIG. 3A, in step 301, a fiber substrate capable of securing rigidity and a fiber substrate capable of securing ductility are selected. For example, the fiber substrate capable of securing rigidity can be a glass fiber substrate and the fiber substrate capable of securing ductility can be a Kevlar fiber substrate.

In step 303, quantity and stacking sequence of the selected fiber substrates are determined. For example, it may be determined that the other fiber substrates are disposed under a glass fiber substrate. Also, it may be determined that the other fiber substrates are disposed under a Uni-directional (UD) prepreg.

In step 305, the fiber substrates are laminated and attached according to the determined quantity and stacking sequence.

FIGS. 3B to 3E illustrate configuration of a composite material sheet according to one or more embodiments.

Figure 3B:
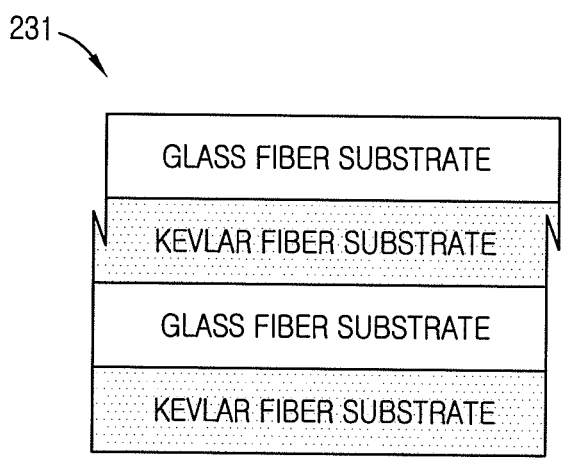
FIGS. 3B to 3E illustrate configuration of a composite material sheet according to one or more embodiments.

Referring to FIG. 3B, the composite material sheet can be manufactured from a glass fiber substrate, a Kevlar fiber substrate which is disposed under the glass fiber substrate, a glass fiber substrate which is disposed under the Kevlar fiber substrate, and a Kevlar fiber substrate which is disposed under the glass fiber substrate.

Figure 3C:
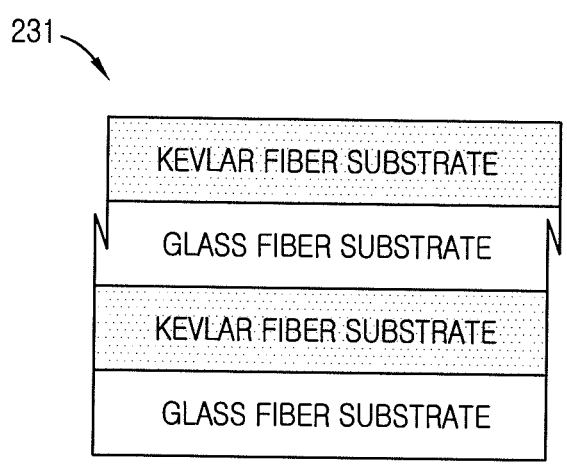

Referring to FIG. 3C, the composite material sheet can be manufactured from a Kevlar fiber substrate, a glass fiber substrate which is disposed under the Kevlar fiber substrate, a Kevlar fiber substrate which is disposed under the glass fiber substrate, and a glass fiber substrate which is disposed under the Kevlar fiber substrate.

Figure 3D:
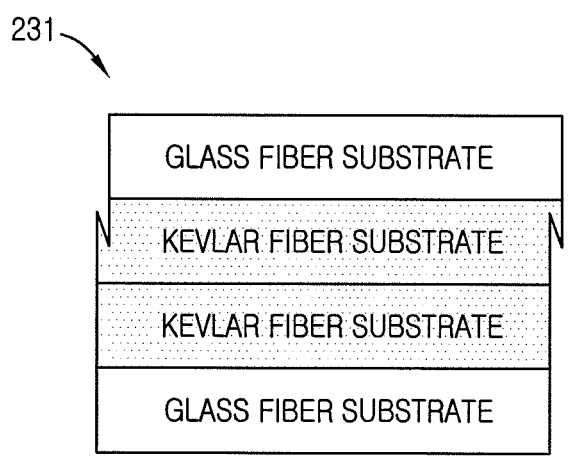

Referring to FIG. 3D, the composite material sheet can be manufactured from a glass fiber substrate, a Kevlar fiber substrate which is disposed under the glass fiber substrate, a Kevlar fiber substrate which is disposed under the Kevlar fiber substrate, and a glass fiber substrate which is disposed under the Kevlar fiber substrate.

Figure 3E:
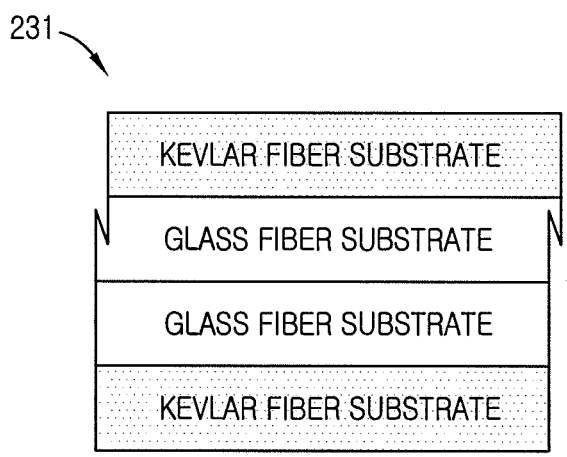

Referring to FIG. 3E, the composite material sheet can be manufactured from a Kevlar fiber substrate, a glass fiber substrate which is disposed under the Kevlar fiber substrate, a glass fiber substrate which is disposed under the glass fiber substrata, and a Kevlar fiber substrate which is disposed under the glass fiber substrate.

Secondly, the composite material sheet can be molded through attachment between fiber substrates using an attachment process such as a hot press and an autoclave after fiber arrays between fiber substrates (prepregs) are crossed and the fiber substrates are laminated. If necessary, quality, stacking sequence, quantity, etc. of the prepregs can be changed. The prepreg is a middle substrate for fiber reinforced composite materials and can be a product in which a reinforced fiber is impregnated with a matrix resin. The prepregs can be a UD prepreg, a plain weave prepreg, a twill prepreg, and a satin weave prepreg, etc. according to a woven type of a reinforced fiber. Coloring, Dyeing, deposition, etc. of the prepreg can be previously executed. Accordingly, the composite material sheet can be beautified. Particularly, because the UD prepreg has a feeling of natural and beautiful arrangement, the UD prepreg can be disposed as an external layer of a composite material device of a rear cover which is disposed on a rear surface of an electronic device.

The UD prepreg has high elasticity to a direction which is vertical to a fiber direction. However, there can be a problem in that the UD prepreg can have a weakness for cracks and tears along the fiber direction. In order to solve the problem, another UD prepreg can be laminated and attached on the UD prepreg. A method of crossing, fiber arrays between the UD prepregs can be used. Also, a method of laminating and attaching a plain weave prepreg, a twill prepreg, a satin weave prepreg, etc. on the UD prepreg can be used. The composite material sheet can secure material properties such as rigidity and ductility through mutual complement among a plurality of prepregs, through these methods. Cross angles of fiber arrays between the UD prepregs can vary between 0 degrees to 90 degrees.

This can be also applied to a plain weave prepreg, a twill prepreg, a satin weave prepreg, etc. as well as a UD prepreg. For example, a plain weave prepreg is laminated and attached on a plain weave prepreg and fiber arrays between the plain weave prepregs are crossed with each other. Therefore, a composite material sheet of high rigidity can be manufactured.

Figure 4A:
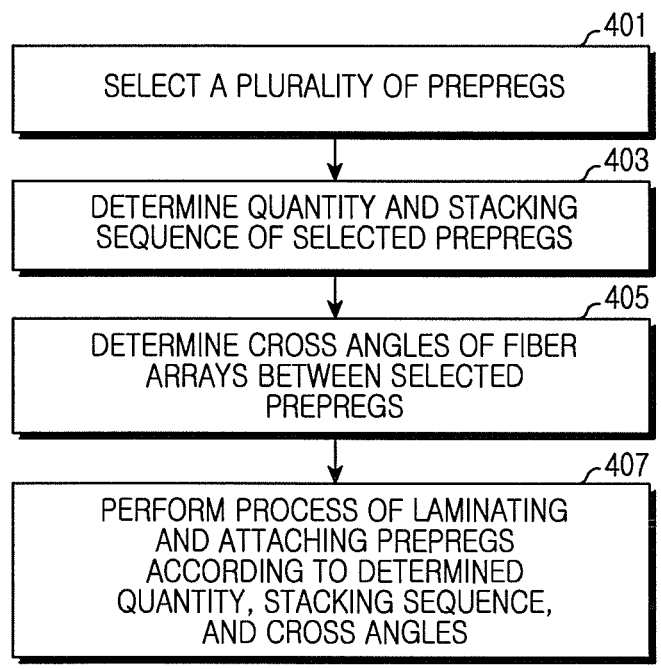
FIG. 4A illustrates a process of manufacturing a composite material sheet according to one or more embodiments.

FIG. 4A illustrates a process of manufacturing a composite material sheet according to one or more embodiments.

Referring to 4A, in step 401, a plurality of prepregs are selected. For example, prepregs can be selected in consideration of material properties such as beauty, rigidity and ductility of a rear cover of an electronic device.

In step 403, quantity and stacking sequence of the selected prepregs are determined. For example, it may be determined that the other prepregs is disposed under a glass fiber substrate. Also, it may be determined that the other prepregs is disposed under a UD prepreg.

In step 405, cross angles of fiber arrays between the selected prepregs can be determined. For example, cross angles of fiber arrays between prepregs which are neighbored when being laminated are determined. These angles can range between 0 degrees to 90 degrees.

In step 407, a process of laminating and attaching the prepregs according to the determined quantity, stacking sequence, and cross angles can be performed.

Figure 4B:
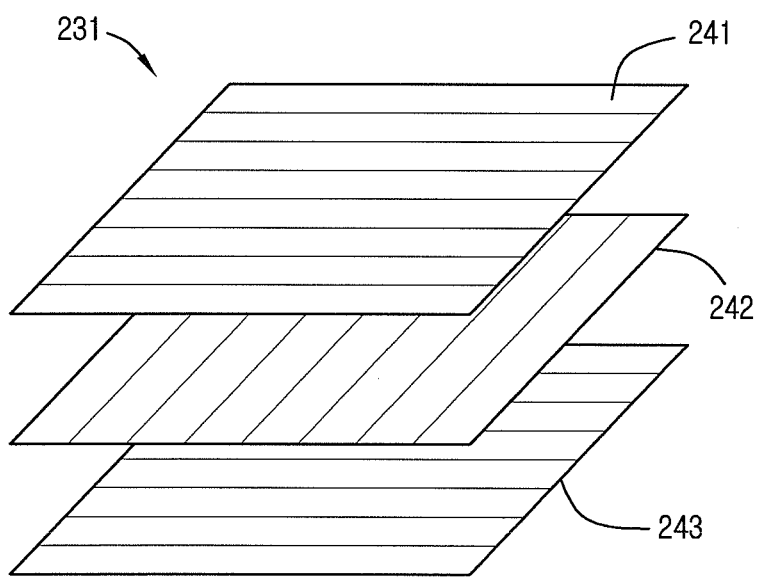
FIGS. 4B to 4D illustrate configuration of a composite material sheet according to one or more embodiments.
Figure 4C:
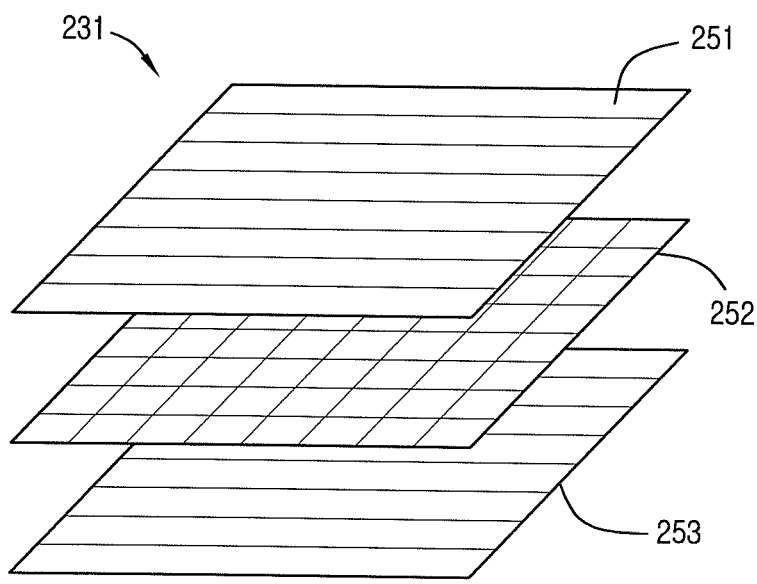
Figure 4D:
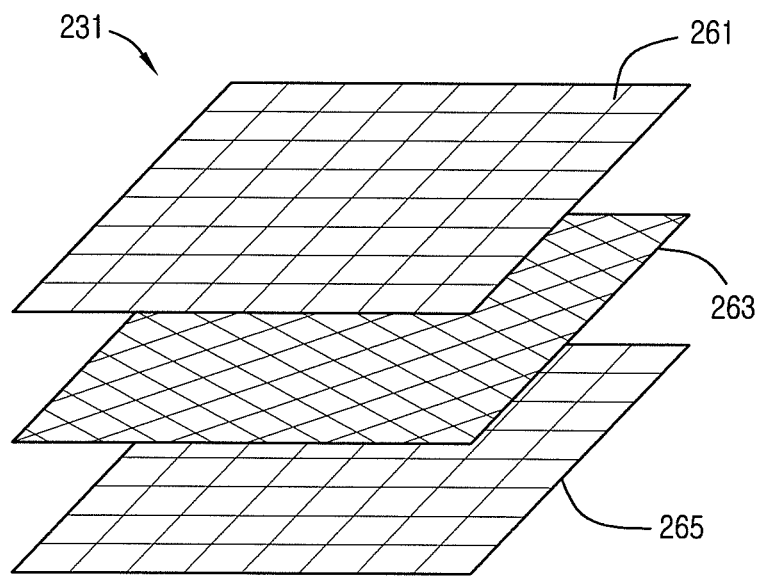

FIGS. 4B to 4D illustrate configuration of a composite material sheet according to one or more embodiments.

Referring to FIG. 4B, a composite material sheet is manufactured through a process of laminating and attaching a plurality of UD prepregs 241 to 243. Fiber arrays between neighboring UD prepregs 241 and 242 or neighboring UD prepregs 242 and 243 can be crossed with each other.

Referring to FIG. 4C, a composite material sheet can be manufactured from UD prepregs 251 and 253 of a horizontal fiber direction and a plain weave prepreg or twill prepreg 252 which is interposed between the prepregs 251 and 253.

Referring to FIG. 4D, a composite material sheet can be manufactured through a process of laminating and attaching a plurality of plain weave prepregs 261 to 263. Fiber arrays between neighboring plain weave prepregs 261 and 263 or neighboring plain weave prepregs 263 and 265 can be crossed with each other.

The composite material sheets formed using the above-described substrates are formed by alternately laminating a rigidity substrate and a ductility substrate or laminating substrates such that fiber arrays of the substrates are crossed with each other. The most inner portion of the composite material sheet can be selectively cut to form a step or opening in the housing or cover.

Figure 5:
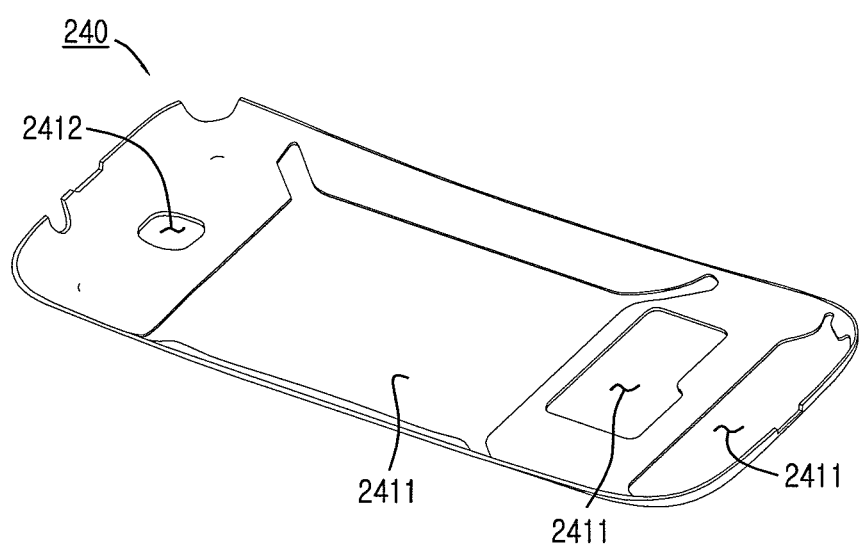
FIG. 5 illustrates a perspective view of a battery cover of an electronic device according to one or more embodiments.

For example, FIG. 5 is a perspective view of a battery cover of an electronic device according to one or more embodiments.

Referring to FIG. 5, when the above-described composite material sheet is applied to a battery cover 240 of a portable terminal which is an electronic device, the battery cover 240 can be cut such that a groove 2411 in a certain region is formed by a protruded tolerance. A fully penetrated region defining opening 2412 capable of exposing a camera lens assembly, a Light Emitting Diode (LED) module, etc. can be formed.

Therefore, the housing and the composite materials manufactured by a manufacturing method thereof can secure material properties such as rigidity and ductility of the housing through mutual complement between laminated and attached fiber substrates and implement a beautiful appearance of the electronic device While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method of manufacturing an electronic device including a housing and plurality of electronic components, the method comprising:
   selecting at least one fiber substrate for securing rigidity and at least one fiber substrate for securing ductility;
   determining a quantity and stacking sequence of the selected fiber substrates; and
   laminating and attaching the fiber substrates according to the determined quantity and stacking sequence, and
   insert molding a plastic injection molding product that is attached to an inner side of the composite materials,
   wherein the plastic injection molding product includes a top surface that is attached along a bottom surface of the composite materials, and
   wherein a center of the top surface of the plastic injection molding product includes an omitted portion where injection products are omitted from the plastic injection molding product with at least one slit that is formed in a direction from an edge of the omitted portion.

2. The method of claim 1, wherein the at least one fiber substrate for securing rigidity is a glass fiber substrate and wherein the at least one fiber substrate for securing ductility is a Kevlar fiber substrate.

3. The method of claim 1, wherein determining the quantity and stacking sequence of the selected fiber substrates comprises determining that one of the at least one fiber substrate for securing rigidity and at least one fiber substrate for securing ductility is disposed under a glass fiber substrate.

4. The method of claim 1, wherein determining the quantity and stacking sequence of the selected fiber substrates comprises determining that one of the at least one fiber substrate for securing rigidity and at least one fiber substrate for securing ductility is disposed under a unidirectional fiber substrate.

5. The method of claim 1, wherein the at least one fiber substrate for security rigidity and the at least one fiber substrate for securing ductility are alternately disposed.

6. The method of claim 1, wherein at least one of the at least one fiber substrate for security rigidity and the at least one fiber substrate for securing ductility is a unidirectional prepreg.

7. The method of claim 6, wherein the at least one fiber substrate for security rigidity and the at least one fiber substrate for securing ductility are laminated by a method in which fiber array directions are crossed with each other.

8. A method of manufacturing an electronic device including a housing and plurality of electronic components, the method comprising:
   selecting a plurality of prepregs;
   determining a quantity and stacking sequence of the selected prepregs;
   determining cross angles of fiber arrays between the selected prepregs; and
   laminating and attaching the prepregs according to the determined quantity, stacking sequence, and cross angles, and
   insert molding a plastic injection molding product that is attached to an inner side of the composite materials,
   wherein the plastic injection molding product includes a top surface that is attached along a bottom surface of the composite materials, and
   wherein a center of the top surface of the plastic injection molding product includes an omitted portion where injection products are omitted from the plastic injection molding product with at least one slit that is formed in a direction from an edge of the omitted portion.

9. The method of claim 8, wherein the selected prepregs include at least one of a unidirectional prepreg, a plain weave prepreg, a twill prepreg, and a satin weave prepreg.

10. The method of claim 8, wherein determining the quantity and stacking sequence of the selected prepregs comprises determining that the other prepregs among the plurality of prepregs are disposed under a glass fiber substrate.

11. The method of claim 8, wherein determining the quantity and stacking sequence of the selected prepregs comprises determining that the other prepregs among the plurality of prepregs are disposed under a unidirectional prepreg.

12. The method of claim 8, wherein determining the cross angles of the fiber arrays between the selected prepregs comprises determining cross angles of fiber arrays between prepregs that are neighboring when being laminated within a range of 0 degrees to 90 degrees.

13. The method of claim 8, wherein the prepregs include at least one prepreg for security rigidity and at least one prepreg for securing ductility that are alternately laminated.

14. The method of claim 13, wherein neighbored prepregs are laminated by a method in which fiber array directions are crossed with each other.

15. An electronic device comprising:
a plurality of electronic components; and
at least one housing configured to protect the electronic components and form an appearance of the electronic device,
wherein the at least one housing includes composite materials in which at least two fiber substrates are laminated and attached, and
a plastic injection molding product that is attached to an inner side of the composite materials by insert molding,
wherein the plastic injection molding product includes a top surface that is attached along a bottom surface of the composite materials, and
wherein a center of the top surface of the plastic injection molding product includes an omitted portion where injection products are omitted from the plastic injection molding product with at least one slit that is formed in a direction from an edge of the omitted portion.

16. The electronic device of claim 15, wherein the at least two fiber substrates include at least one fiber substrate for securing rigidity and/or at least one fiber substrate for securing ductility.

17. The electronic device of claim 15, wherein neighboring fiber substrates of the at least two fiber substrates are heterogeneous fiber substrates.

18. The electronic device of claim 15, wherein neighboring fiber substrates of the at least two fiber substrates have fiber arrays that are crossed with each other.

19. The electronic device of claim 15, wherein the at least two fiber substrates include at least one of a unidirectional prepreg, a plain weave prepreg, a twill prepreg, and a satin weave prepreg.

20. The electronic device of claim 15, wherein the composite materials that form the appearance of the at least one housing include a glass fiber substrate that is disposed on a most upper layer of the at least one housing.

21. The electronic device of claim 15, wherein the composite materials that form the appearance of the at least one housing include a unidirectional prepreg that is disposed on a most upper layer of the housing.

22. The electronic device of claim 15, wherein the composite materials have a most inner side comprising at least one of a stepped portion cut to a predetermined depth in a predetermined region in the at least one housing and a fully penetrated portion defining an opening in a predetermined region in the at least one housing.

* * * * *